United States Patent
Jothimurugesan et al.

(10) Patent No.: US 7,259,286 B2
(45) Date of Patent: Aug. 21, 2007

(54) ATTRITION RESISTANT BULK IRON CATALYSTS AND PROCESSES FOR PREPARING AND USING SAME

(75) Inventors: Kandaswamy Jothimurugesan, Ponca City, OK (US); James G. Goodwin, Jr., Clemson, SC (US); Santosh K. Gangwal, Cary, NC (US)

(73) Assignees: Research Triangle Institute, Research Triangle Park, NC (US); The University of Pittsburgh-of the Commonwealth System of Higher Education, Pittsburgh, PA (US)

( * ) Notice: Subject to any disclaimer, the term of this patent is extended or adjusted under 35 U.S.C. 154(b) by 20 days.

(21) Appl. No.: 10/344,896

(22) PCT Filed: Aug. 28, 2001

(86) PCT No.: PCT/US01/26005

§ 371 (c)(1),
(2), (4) Date: Nov. 3, 2003

(87) PCT Pub. No.: WO02/18043

PCT Pub. Date: Mar. 7, 2002

(65) Prior Publication Data

US 2004/0220437 A1 Nov. 4, 2004

Related U.S. Application Data

(60) Provisional application No. 60/227,913, filed on Aug. 28, 2000.

(51) Int. Cl.
*C07C 1/00* (2006.01)
*C07C 27/00* (2006.01)
*C01B 3/12* (2006.01)
*C22F 3/00* (2006.01)

(52) U.S. Cl. .................... 585/638; 48/197 R; 502/177; 502/258; 502/325; 502/326; 502/327; 502/332; 502/336; 502/338; 502/407; 502/439; 518/702; 518/715; 518/719; 518/721; 423/655; 423/656; 585/733; 585/12

(58) Field of Classification Search ................ 502/177, 502/258, 325, 326, 327, 332, 336, 338, 407, 502/439; 518/702, 715, 719, 721; 423/655, 423/656; 585/638, 733, 12; 148/197 R
See application file for complete search history.

(56) References Cited

U.S. PATENT DOCUMENTS

| 3,579,293 A | 5/1971 | Shultz et al. |
| 3,657,155 A * | 4/1972 | Kanagawa et al. ......... 502/249 |
| 4,086,187 A | 4/1978 | Lim et al. |
| 4,089,809 A | 5/1978 | Farrior, Jr. |
| 4,107,085 A | 8/1978 | Sasaki et al. |
| 4,372,755 A * | 2/1983 | Tolman et al. ............ 48/197 R |
| RE31,719 E | 10/1984 | Sonetaka et al. |
| 4,477,595 A | 10/1984 | Madon |
| 4,547,525 A * | 10/1985 | Kim .......................... 518/713 |
| 4,605,678 A | 8/1986 | Brennan et al. |
| 4,622,308 A | 11/1986 | Koikeda et al. |
| 4,849,539 A | 7/1989 | Bergna |
| 4,857,559 A | 8/1989 | Eri et al. |
| 4,952,389 A | 8/1990 | Szymanski et al. |
| 5,023,276 A | 6/1991 | Yarrington et al. |
| 5,053,581 A | 10/1991 | Hildinger et al. |
| 5,112,793 A | 5/1992 | Magistro |
| 5,227,407 A | 7/1993 | Kim |
| 5,254,516 A | 10/1993 | Gupta et al. |
| 5,288,739 A | 2/1994 | Demmel |
| 5,620,670 A | 4/1997 | Benham et al. |
| 5,928,980 A | 7/1999 | Gangwal et al. |
| 5,972,835 A | 10/1999 | Gupta |
| 6,043,288 A | 3/2000 | DeGeorge et al. |
| 6,100,215 A | 8/2000 | Sasaki et al. |
| 6,548,440 B1 * | 4/2003 | Pham et al. ................... 502/71 |
| 2002/0156137 A1* | 10/2002 | Zhou et al. ................. 518/719 |
| 2004/0122115 A1* | 6/2004 | Espinoza et al. ........... 518/721 |
| 2005/0236304 A1* | 10/2005 | Soled et al. ............ 208/216 R |

FOREIGN PATENT DOCUMENTS

WO   WO99/49965   * 10/1999

* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

An attrition resistant precipitated bulk iron catalyst is prepared from iron oxide precursor and a binder by spray drying. The catalysts are preferably used in carbon monoxide hydrogenation processes such as Fischer-Tropsch synthesis. These catalysts are suitable for use in fluidized-bed reactors, transport reactors and, especially, slurry bubble column reactors.

42 Claims, 1 Drawing Sheet

ATTRITION RESISTANT BULK IRON CATALYSTS AND PROCESSES FOR PREPARING AND USING SAME

This invention was made with Government support under Contract No.: DE-FG22-96PC96217 awarded by the U.S. Department of Energy (DOE). The Government has certain rights in this invention.

FIELD OF THE INVENTION

This invention relates to iron catalysts for carbon monoxide hydrogenation processes such as Fischer-Tropsch synthesis. More specifically, the invention relates to bulk iron, i.e., high iron content, catalysts that are attrition-resistant, that can be used in slurry bubble column reactors, fluidized-bed reactors, and the like, and to processes for preparing and using these catalysts.

BACKGROUND OF THE INVENTION

Fischer-Tropsch synthesis (FTS) is a set of reactions by which CO and $H_2$ (syngas) are converted into a wide variety of hydrocarbons [Dry, M. E., Catalysis-Science and Technology, p. 160, (1980); Anderson, R. B., et al., The Fischer-Tropsch synthesis, Academic Press, Inc., NY, (1984)]. This synthesis provides the best means currently available for the conversion of natural gas and carbonaceous fuels such as coal, coke, and petroleum residue to liquids and chemicals, particularly fuel and premium waxes. When FTS is used to convert low hydrogen-to-carbon ratio solid fuels, for reforming of natural gas with $CO_2$, or for other feedstocks producing a syngas relatively lean in hydrogen ($H_2/CO \cong 0.4$ to 1.0), the use of a catalyst with water gas shift (WGS) activity is highly preferred in order to generate additional $H_2$ during the reaction as seen below:

$CO + 2H_2 \rightarrow (-CH_2-)_n + H_2O$ (FTS)

$CO + H_2O \rightarrow CO_2 + H_2$ (WGS)

Iron (Fe) is the preferred catalyst for low $H_2/CO$ ratio syngas over its competitor cobalt (Co) because iron is one of the most active FTS catalysts that is also active for WGS. Iron is also much less expensive than Co and has lower methane selectivity in FTS. For these reasons, iron FTS catalysts have been the subject of extensive research focus; see, for example, Bukur, D. B., et al., Natural Gas Conversion IV, Vol. 107, p. 163, (1997); Jothimurugesan, K., et al., Natural Gas Conversion V, Studies in Surface Science and Catalysis, Vol. 119, p. 215 (1998); Jothimurugesan, K., et al., Catalysis Today, Vol. 58, p. 335, (2000); O'Brien, R. J., et al., Applied Catalysis A: General, Vol. 196, p.173, (2000); and Liaw, S. and Davis, B. H., Topics in Catalysis, Vol. 10, p. 133, (2000).

Because FTS is highly exothermic, efficient heat removal from the FTS reactor is necessary to prevent catalyst deactivation via sintering and to maintain high catalyst activity and selectivity. A slurry bubble column reactor (SBCR) is the preferred reactor type for FTS. The reactor operates with fine catalyst particles dispersed in a liquid medium and gas is sparged as fine bubbles from the reactor bottom into the liquid. The preferred liquid medium for FTS is the wax product produced in the FTS reaction itself. The wax provides an efficient heat sink and the gas bubbles provide agitation and allow the heat to be rapidly absorbed and dissipated. SBCRs have relatively simple designs and low initial costs while still permitting high catalyst and reactor productivity. Other advantages of SBCRs for FTS include the ability to use low $H_2/CO$ ratio syngas and favorable conditions for catalyst regeneration and/or makeup.

Much recent work related to slurry-phase FTS has focused on using iron catalysts. These catalysts have been prepared by precipitation to achieve high activity for FTS and high selectivity for liquid hydrocarbon and wax. Alpha (α) is the well-known Anderson-Schulz-Flory chain growth parameter and is a measure of a catalyst's ability to make liquids and waxes while making less gas. A catalyst with an α of 0.9 or higher and methane selectivity below five percent is preferred for FTS. Bulk iron catalysts, i.e., iron catalysts having an iron content, calculated as $Fe_2O_3$, exceeding about 50 weight percent (wt. %) prepared by precipitation are preferred catalysts, as compared to bulk iron catalysts prepared by fusion, or to supported iron catalysts prepared by impregnation of iron onto a support because of the high activity and selectivity of the precipitated bulk iron catalysts. Preparation of precipitated bulk iron catalysts for FTS has been extensively reviewed [Dry, (1980); Anderson (1984); Lang, X., et al., Industrial and Engineering Chemistry Research, Vol. 34, p. 73, (1995)]. They are typically prepared using iron nitrate as an iron oxide precursor. Copper, (Cu), potassium, (K), and/or $SiO_2$ are added as reduction, chemical, and textural promoters, respectively. The addition of potassium results in a higher α catalyst.

Catalyst attrition is currently a major obstacle to industrial application of precipitated bulk iron catalysts in a SBCR [Bhatt, et al. Proceedings of the 1997 Coal Liquefaction and Solid Fuels Contractor Review Conference, U.S. Department of Energy (DOE), Pittsburgh, Pa., p. 41, Sep. 3-4, 1997; Srinivasan, R et al., Fuel Science Technology International, Vol. 14, p.1337, (1996)]. The non-uniform particles and, especially, the irregular shapes of the catalyst particles produced by precipitation lead to production of catalyst fines by abrasion during use. In turn, attrition of iron catalysts causes (i) plugging of filters, (ii) difficulty in separation of liquid/wax product from the catalyst, and (iii) steady loss of catalyst fines from the reactors.

A number of recent patents [Chaudhary, V. R. et al., U.S. Pat. No. 5,744,419 (1998); Gangwal, S. K. and Jothimurugesan, K., U.S. Pat. No. 5,928,980 (1999); Espinoza, R. L. et al., U.S. Pat. No. 5,733,839 (1998); Rivas, L. A. et al., U.S. Pat. No. 5,710,093 (1998); Moy D., U.S. Pat. No. 5,569,635 (1996)] are directed to the preparation and use of attrition-resistant, supported iron and other metal catalysts for FTS and other processes. Although the use of catalyst supports such as alumina (prepared as spheroids by spray drying) can improve catalyst attrition resistance, supported iron catalysts are generally limited to an iron oxide content of less than 30 wt. %, and have been found to have much lower activity compared to bulk iron catalysts for FTS [Dry, (1980); Anderson, (1984); Bukur, D. B., et al., J. Catalysts, Vol. 29, p. 1588, (1990)]. This is because much less iron is available per unit weight of catalyst. The supports also inhibit the activity of promoters and iron reduction and, thus, reduce catalyst effectiveness.

Improving the attrition properties of bulk iron catalysts is particularly difficult because bulk iron catalysts in a FTS SBCR are subject to both physical attrition and chemical attrition. Physical attrition can be caused by particle collision with other particles or reactor walls and by rapid sparging of gas around the particles. Chemical attrition can be caused during catalyst pretreatment and/or during FTS by iron catalyst phase changes ($Fe_2O_3 \rightarrow Fe_3O_4 \rightarrow Fe$ metal and/or Fe carbide), resulting in a decrease or complete loss of physical integrity of the catalyst particles.

Although chemical attrition during the pretreatment of precipitated bulk iron catalysts and during FTS, is not clearly understood, it is well known that the active iron phase for FTS is an iron carbide [Srivastava, et al., Hydrocarbon Processing, (1990); Rao, V. et al., Fuel Processing Technology, Vol. 30, p. 83, (1992)]. The common pretreatment conditions employed are $H_2$ reduction, CO reduction, or syngas reduction with the later two resulting in a more active and higher $\alpha$ catalyst. At least five forms of iron carbides are known to exist; three octahedral-carbides with carbon in the octahedral interstices, and two trigonal prismatic-carbides with carbon in trigonal prismatic interstices. Although the role of these carbides in FTS is not resolved, the multiplicity of carbide phases and iron oxidation states can cause grain boundaries to grow during FTS which can place significant stresses on the iron particle that can lead to chemical attrition.

Spray drying using an appropriate binder is the industrial method of choice for producing microspheroid (40-120 µm) attrition resistant fluidized catalytic cracking (FCC) catalysts and fluidizable alumina in large quantities. It consists of first producing a slurry of catalyst precursor dispersed in a solution of the binder oxide precursor that will form the hard phase of the catalyst [Stiles, A. B., Catalyst Manufacture, Marcel Dekker, Inc., NY, (1983)]. The oxide material must be in the form of discrete colloidal particles. The slurry is then spray dried to form "green" microspheres, mostly larger than 40 µm and mostly smaller than 120 µm that are calcined (heat treated in air) at an appropriate temperature (typically 300-500° C.) to produce attrition-resistant microspheroid particles.

Typically, attrition-resistant particles produced by spray drying require 25 to 50 wt. % binder constituting a continuous framework in which are embedded small particles of the active catalyst. Some binders typically used in industry include colloidal silica, colloidal alumina, kaolin clay, and phosphate-modified clay. Bergna, U.S. Pat. No. 4,849,539, (1989); Bergna, U.S. Pat. No. 4,677,084, (1987); and Bergna, H. E. et al., *Catalysis Today*, 1, p. 49, (1987); disclose a process for producing spray dried, attrition-resistant vanadium oxide/phosphorous oxide catalysts having a lower binder content, preferably about 10 wt % silica-based binder, wherein the binder is added in the form of subcolloidal size particles. During the spray drying process, the subcolloidal size particles of the binder migrate between the spaces of the much larger particles of catalyst or catalyst precursor, to the surface of the spray dried particles and form a hard peripheral composite exterior shell after sintering.

Past attempts to produce attrition-resistant, precipitated bulk iron FTS catalyst microspheres by spray drying have met with failure [Srinivasan et. al. (1996); Bhatt et al., (1997); O'Brien et al., Coal Liquefaction and Gas Conversion Contractor's Review Conference, DOE, (1995)]. In fact, attrition was so severe for a spray dried, high $\alpha$ iron FTS catalyst prepared by United Catalysts, Inc. that a FTS pilot plant at Laporte, Tex. operated by Air Products for DOE had to shut down after only a few hours of testing due to production of catalyst fines and filter plugging [Private Communication with DOE, (1999)].

Espinoza et al, PCT Application WO99/49965, (1999) claim that attrition resistance of precipitated iron FTS catalysts can be increased simply by heat treatment at temperatures above 300° C. without the use of spray drying or binders. However, it is well known that nearly all heterogeneous catalysts, including precipitated iron FTS catalysts, are calcined at 300° C. or higher [Jothimurugesan et al., (1998); Gormley, R. J., et al., *Applied Catalysis A: General*, Vol. 161, p. 263, (1997)]. Espinoza et al. do not present any attrition results of carbided or used catalysts. Benham et al, U.S. Pat. No. 5,504,118, (1996) teach the preparation of a 5 to 50 µm size iron FTS catalyst for slurry-phase FTS by spray drying without the use of binders. However, these catalysts are not said to be attrition resistant. Thus, such catalyst would not suitable for a slurry-phase reactor from an attrition standpoint and, in addition, the catalysts particles in the lower portion of the 5 to 50 µm particle size range would be likely to plug filters through which wax is removed from the reactor.

Thus, despite substantial effort and research, there are no commercially available precipitated bulk iron FTS catalysts, which are attrition resistant and have substantial catalytic activity. Accordingly, in practice, commercially available precipitated bulk iron catalysts, such as the standard Ruhrchemie pelletized catalyst, are supplied in pelletized form and are limited to use in fixed bed reactors. Nevertheless, precipitated bulk iron catalysts remain the preferred FTS catalysts for low $H_2$/CO ratio syngas processes due to their high activity and selectivity.

SUMMARY OF THE INVENTION

This invention provides attrition resistant bulk iron catalysts for CO hydrogenation processes such as FTS. The attrition resistant bulk iron catalysts of the invention can be used in slurry bubble column reactors, fluidized bed reactors, and in other highly abrasive environments without unacceptable attrition. Nevertheless, the attrition resistant bulk iron catalysts of the invention have high activity and selectivity, comparable to or exceeding the activity and selectivity of conventional pelletized, precipitated bulk iron catalysts, such as the Ruhrchemie catalyst. The invention also provides processes for producing attrition resistant bulk iron catalysts and processes for use of the catalysts.

The attrition resistant bulk iron catalysts of the invention are substantially spherical particles comprising a finely divided iron component such as one or more iron oxides, typically $Fe_2O_3$, an iron oxide precursor, or an activated form of iron oxide, e.g., iron carbide or elemental iron (iron metal), and a substantially uniform distribution of binder, preferably silica. Advantageously, the iron component is present in an amount, calculated as $Fe_2O_3$, of at least about 50 wt. %, preferably at least about 60 wt. %, more preferably at least about 70 wt. %, most preferably about 80 wt. % or higher, based on adjusted catalyst weight (adjusted as necessary so that the iron component is calculated as $Fe_2O_3$). Advantageously, the catalysts of the invention also comprise an FTS promoter such as a copper and/or potassium FTS promoter, or a precursor thereof. Preferably, the binder content of the attrition resistant bulk iron catalysts of the invention is less than about 20 wt. %, more preferably between about 8 and about 16 wt. %. In preferred embodiments, the attrition resistant bulk iron catalysts of the invention have a bulk density exceeding 0.8 grams per cubic centimeter ($g/cm^3$), more preferably, exceeding 0.8 grams per cubic centimeter $g/cm^3$. Accordingly the bulk iron catalysts of the invention can be more readily separated from hydrocarbon products such as wax, compared to conventional precipitated bulk iron catalysts, which have a density of about 0.7 $g/cm^3$, about the same as the density of wax.

According to another aspect, the present invention provides a process for producing attrition resistant bulk iron catalysts comprising the steps of forming a slurry which comprises a precipitated iron oxide precursor or its derivative (i.e., an iron oxide derivative or a catalytically activated iron derivative of the iron oxide precursor) and a binder, and spray drying the slurry to form substantially spherical particles. Advantageously the precipitated iron oxide precursor or its derivative comprises at least about 50 wt. %, calculated as $Fe_2O_3$, of the dry solids content of the slurry. Preferably, the spray dried particles are calcined for a time and at a temperature sufficient to convert iron oxide precursor to iron oxide, typically at a temperature exceeding about 200° C., preferably at a temperature exceeding about 250° C., more preferably at a temperature exceeding about 275° C. Advantageously the calcined particles are activated by treating the calcined particles under conditions sufficient to convert iron oxide to a catalytically active iron composition, preferably an iron carbide containing composition.

In one preferred aspect of the invention, the slurry is treated with sufficient strong acid to reduce the pH to less than 2.0, preferably to about 1.0 to 1.5 prior to the spray drying step. A preferred strong acid is nitric acid. In accordance with this aspect of the invention, it has been found that reducing the slurry pH to below about 2.0, preferably to below about 1.5, before spray drying significantly improves the attrition properties, i.e., reduces the attrition loss, of the bulk iron catalyst of the invention.

The starting materials for the bulk iron catalyst of the invention are readily available in commerce. The catalyst of this invention has been found capable of providing FTS activity and selectivity that are much higher than supported iron catalysts reported in the prior art (for example, U.S. Pat. No. 5,928,980). The iron catalyst according to the present invention can be used because of its high attrition resistance in both calcined and carbided forms in virtually any reaction process including FTS, that uses a fluidized-bed reactor, or especially a slurry bubble column reactor.

BRIEF DESCRIPTION OF THE DRAWINGS

In the drawings which form a portion of the original disclosure of the invention.

DETAILED DESCRIPTION OF THE PREFERRED EMBODIMENT

In the following detailed description, preferred embodiments of the invention are described to enable practice of the invention. Although specific terms are used to describe and illustrate the preferred embodiments, such terms are not intended as limitations on practice of the invention. Moreover, although the invention is described with reference to the preferred embodiments, numerous variations and modifications of the invention will be apparent to those of skill in the art upon consideration of the foregoing and following description.

As used herein, the term "bulk iron" catalysts refers to catalysts having an average content of an iron component selected from the group consisting of iron oxide ($Fe_2O_3$), an iron oxide precursor, or a catalytically active iron composition which can be derived from iron oxide, typically iron carbide(s) or elemental iron, in an amount of at least about 50 wt. %, calculated as $Fe_2O_3$, of the adjusted weight of catalyst. "Adjusted weight" of catalysts and slurries used to form catalysts of the invention, as used herein, refers to the actual weight adjusted as necessary so that the iron component is calculated as $Fe_2O_3$. Further, unless expressly stated otherwise, all weight percentages of catalysts (including "green", calcined and activated catalysts) and slurries used to prepare the catalysts, are calculated herein such that the iron component is calculated as $Fe_2O_3$, and the total catalyst or solids weight of the slurry is calculated as adjusted weight.

The attrition resistant bulk iron catalyst of the invention is prepared by spray drying a slurry which comprises a precipitated iron oxide precursor and a binder. Alternatively, the bulk iron catalyst is prepared by spray drying a slurry comprising an iron oxide derivative or a catalytically activated iron derivative of a precipitated iron oxide precursor, and a binder. Precipitated iron oxide precursors are well known to those skilled in the art and include iron nitrate, preferably $Fe(NO_3)_3$, iron sulfate, iron chloride, iron acetate and other organometallic compounds such as iron carbonyls, and the like. Precipitated iron oxide precursors evidence a significantly higher surface area, as compared to iron oxide precursors prepared by other methods, as is well know in the art. Iron oxide derivatives of precipitated iron oxide precursor are, as is also well known to those skilled in the art, the iron oxide compound or compounds (typically $Fe_2O_3$) produced by calcining the iron oxide precursor in an oxygen-containing environment. Catalytically activated iron derivatives of precipitated iron oxide precursors are the active iron phase(s) and/or compound(s) for FTS, including iron carbides and/or elemental iron prepared by the pretreatment of FTS iron catalysts, typically via $H_2$ reduction, CO reduction, or syngas reduction, as will also be apparent to the skilled artisan. Preferably, the iron component of the slurry used in the process of the present invention is a precipitated iron oxide precursor, and the preferred iron oxide precursor is $Fe(NO_3)_3$.

Advantageously, at least about 50 wt. % of the dry solids content of the slurry is made up by the precipitated iron oxide precursor or derivative (iron oxide or catalytically activated iron derivative), calculated as $Fe_2O_3$. Preferably at least about 60 wt. %, more preferably, at least about 70 wt. %, most preferably about 80 wt. % or more, of the dry solids content of the slurry is made up by the precipitated iron oxide precursor or derivative, calculated as $Fe_2O_3$. Advantageously, the iron oxide precursor is a wet filtered cake recovered directly from a precipitation process or step.

Preferably the slurry also comprises one or more FTS promoters or precursor(s) thereof. FTS promoters are well known to those skilled in the art and include chemical promoters such as metals and/or oxides thereof of Cu, K, Ru, noble metals such as Pt, Mn, and Cr, and textural promoters such as $SiO_2$. The preferred chemical promoters are oxides of Cu, and K. Preferably, the promoters are present in the slurry as precursors formed by precipitation. It is also preferred that the promoter precursor(s) be formed in the precipitation step used to form the iron oxide precursor. $SiO_2$, when used as a textural promoter, is added to the slurry as particulate $SiO_2$ or as a particulate precursor of $SiO_2$, preferably prepared by precipitation. The preferred Cu precursor is $Cu(NO_3)_2$. The preferred K precursor is $KHCO_3$. The preferred $SiO_2$ precursor is precipitated tetraethylorthosilicate, $Si(OC_2H_5)_4$. The slurry can also include catalyst support materials, if desired, or substantially inert fillers, stabilizers, or the like.

The binder used in the slurry is preferably an oxide binder precursor dissolved or dispersed in a solvent, preferably water. In particular, the oxide precursor consists essentially of an oxide precursor of subcolloidal particle size. "Subcolloidal particles" (size) are defined herein as particles for which the largest dimension is no greater than about 5 nm. The particles must not aggregate, precipitate or gel during or following the formation of the binder solution or upon contact with the catalyst, catalyst precursor or catalyst support particles. The subcolloidal particles must provide a sufficiently stable suspension, i.e., solution, and slurry to permit spray drying. The oxide can be chosen from the group comprising $SiO_2$, $Al_2O_3$, $P_2O_5$, $TiO_2$, $ZrO_2$, $MgO$, $Cr_2O_3$, and rare earth oxides. Examples of binder solutions for these oxides include silicic acid, basic aluminum chloride, phosphoric acid, titanyl oxychloride, hydrolyzed zirconyl nitrate, magnesium acetate, hydrolyzed basic chromic chloride ($Cr(OH)_2Cl_4$) and hydrolyzed basic nitrates of rare earths. The preferred oxide is $SiO_2$ and the preferred oxide precursor is silicic acid, especially polysilicic acid.

The preferred binder includes an $SiO_2$ precursor comprising polysilicic acid (PSA) and water. The PSA is preferably formed from sodium silicate in a water solution. Such solutions are advantageously prepared by diluting a sodium silicate solution with distilled water to yield a relatively high pH of e.g., 11.4, adding a solution acidifier preferably a strong nuclear sulfonic acid cation exchanger such as Dovex® HCR-W2-H resin to bringing the pH down to 1.5 to 2.0. Preparation of such binder solutions is well known to those skilled in the art and is disclosed, for example in U.S. Pat. No. 4,849,539, (1989), and U,S. Pat. No. 4,677,084, (1987) to Bergna, which are hereby incorporated herein by reference.

In a preferred embodiment of the invention, the slurry is further treated with sufficient strong acid to reduce the pH to less than 2.0, preferably to about 1.0 to 1.5. A currently preferred strong acid is nitric acid. Reducing the slurry pH to below about 2.0, preferably to below about 1.5, before spray drying has been found to significantly improve the attrition properties of the catalyst. It is also preferred that the binder content of the slurry is less than about 20 wt. %, calculated based on dry solids adjusted weight of the slurry, more preferably is between about 4 and about 20 wt. %, and even more preferably is between about 8 and about 16 wt. % of the dry solids adjusted weight of the slurry.

The slurry is spray dried using conventional processes and apparatus to form substantially spherical spray dried particles. Preferably the size of the particles is such that at least about 80 percent by volume of the particles have a diameter between 40 and 120 μm. Conventional spray drying processes and apparatus are well known to those skilled in the art. The selection of apparatus, and process conditions to achieve the foregoing particle size distribution can be readily accomplished by a skilled artisan apprised of present disclosure. Advantageously the slurry is spray dried at a temperature above about 200° C., preferably about 250° C., in a spray drying chamber to form the substantially spherical spray dried particles. Preferable, the slurry has a solids content of between about 10 and about 20 wt. % based on the adjusted weight of the slurry, and thus has a water content of between about 80 and 90 wt. %.

Thereafter the spray dried particles are preferably calcined in an oxygen-containing atmosphere to convert the iron oxide precursor and the promoter precursor to iron oxide and to the promoter, respectively. Typically the calcining temperature exceeds about 200° C., and is preferably a temperature exceeding about 250° C., more preferably about 275° C., or higher, e.g., 300° C. In general it is preferred that calcining be conducted at a temperature at least about 25° C. above the reaction temperature of the predetermined catalytic process, such as FTS, for which the catalyst is to used.

Preferably, the calcined particles are thereafter activated by treating the calcined particles under conditions sufficient to convert the iron oxide to a catalytically active composition, such as a composition containing iron metal or iron carbide, preferably an iron carbide containing composition. Advantageously this is accomplished by exposing the calcined particles to CO or to a mixture of CO and $H_2$, at a temperature 270-300° C. and at a pressure of from 0.1 to 0.2 MPa for an extended time, e.g., 12 hours, to carbide the catalyst. The catalyst is then ready for FTS using syngas or for use in another carbon monoxide or other reducing gas hydrogenation process, such as a water gas shift reaction. The preferred reducing gases are CO or a mixture of $H_2$ and CO (syngas), with syngas in a $H_2$ to CO ratio of 0.4 to 1.0 being the preferred reducing gas.

In a preferred aspect of the invention, the bulk precipitated iron catalyst is prepared by the steps set forth below.

Prepare an aqueous solution containing Fe $(NO_3)_3$ (1.0M) together with $Cu(NO_3)_2$ (1.0M) that corresponds to a ratio of 100 Fe to 5 Cu and tetraethylorthosilicate that corresponds to a ratio of 100 Fe to 0 to 25 $SiO_2$. Prepare an ammonium hydroxide solution (27M) in a separate container, and pump the two solutions into a well-mixed third container at controlled flow rate to precipitate the iron oxide precursor and copper promoter precursor at a pH of 6.2 and room temperature. The precipitate is preferably washed with deionized, distilled water and vacuum filtered to remove excess $NH_4OH$ and to prepare a wet cake.

Prepare a 1 molar solution of $KHCO_3$ in an amount that corresponds to a ratio of 100 Fe/5 Cu/4.2K and add it to the wet cake.

Prepare a polysilicic acid (PSA) solution by diluting sodium silicate solution with distilled water to yield a pH of 11.4, and add Dovex® HCR-W2-H resin to bring the pH down to 3.0. Add a sufficient amount of this PSA solution to the wet cake to give an Fe (calculated in this case as Fe, only) to $SiO_2$ ratio ranging from 100/4 to 100/20. Then add sufficient concentrated nitric acid to bring the pH down to 1.0-1.5.

Spray dry the resultant slurry in a 250° C. spray dryer chamber through a bottom feed two-fluid nozzle to produce microspheroidal particles in the 40 to 120 μm range.

Calcine the spray dried particles in air at 300° C. for five hours. Load the desired amount of the calcined spray dried catalyst into a fixed-bed reactor. Pass CO or syngas at 0.1 to 0.2 MPa through the catalyst and slowly raise the temperature (<2° C./min.) to 280° C. and hold it at that temperature for 12 hours. The catalyst is now activated and ready for FTS at desired pressure and temperature after transferring it to a desired reactor, preferably a fluidized-bed or slurry bubble column reactor. If desired, the catalyst can be activated 'in situ' in the fluidized-bed or slurry bubble column reactor.

Figure 1:
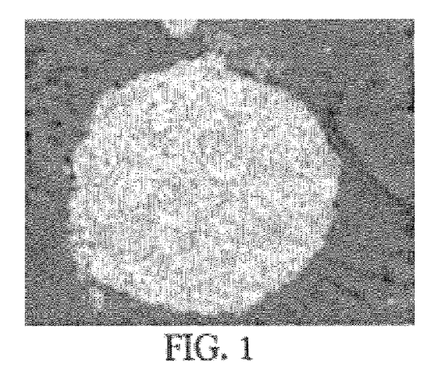
FIG. 1 is a scanning electron microscope (SEM) photomicrograph taken of the cross section of a single particle having a diameter of about 70 μm, of one preferred attrition resistant bulk iron catalyst of the invention.
Figure 2:
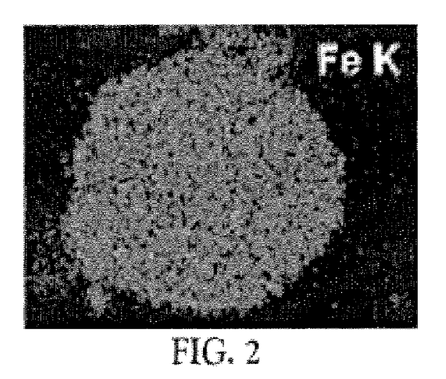
FIG. 2 is an energy dispersive x-ray spectroscopy (EDXS) SEM photomicrograph, taken of the cross section of a single particle having a diameter of about 70 μm, of the same attrition resistant bulk iron catalyst of the invention as in FIG. 1, and demonstrates the substantially uniform distribution of iron in the catalyst particle.
Figure 3:
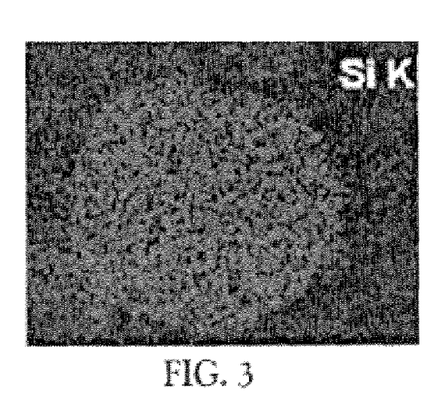
FIG. 3 is an EDXS SEM photomicrograph taken of the cross section of a single particle having a diameter of about 70 μm, of the same attrition resistant bulk iron catalyst of the invention as in FIGS. 1 and 2, and demonstrates the substantially uniform distribution of silicon in the catalyst particle.

FIGS. 1-3 are SEM photomicrographs of the cross section of a single particle having a diameter of about 70 μm, of one preferred attrition resistant bulk iron catalyst of the invention and are also representative of additional photomicrographs taken of other preferred attrition resistant bulk iron catalyst particles of the invention. The photomicrographs of FIGS. 2 and 3 were taken using EDXS to determine the distribution of iron and silicon, respectively, in the catalyst particles. As can be seen from FIGS. 2 and 3, the attrition resistant bulk iron catalysts of the invention exhibit a substantially uniform distribution of iron and silicon. Thus, the binder does not migrate to the surface of the particle as it does in the catalysts produced by Bergna in U.S. Pat. Nos. 4,677,084 and 4,849,539; and, R. M., Bergna, H. E. et al.,
*Catalysis Today*, 1, p. 49, (1987). Moreover, although, in the catalyst particles of Bergna, sintering is said to be almost always necessary, examination of preferred catalyst particles of the invention following calcining reveals no crystalline silica, indicating that sintering of the silica binder has not occurred. Also, unlike the process used by Bergna, in which the spray drying slurry is prepared using a dry powder catalyst precursor, in this invention the catalyst precursor is advantageously a wet filtered cake from precipitation.

Table 1 shows the attrition properties of catalysts of the invention, which were prepared according to Examples 1-13, set forth hereinafter. Each of these catalysts had a weight ratio of Fe, Cu, and K of 100 Fe/5 Cu/4.2 K, calculated in this case based on the weights of the Fe, Cu, and K, elements only. As mentioned earlier, silica can be added to the catalyst in two ways, as a particulate in the case of a silica textural promoter, and as a component of the binder solution in the case of a silica binder. In the catalysts shown in Table 1, silica added as a textural promoter in particulate form (typically as a precipitate from (tetraethylorthosilicate) is designated as P(x) where x is the silica parts by weight that is left in the catalyst after calcining. The silica added in a binder solution was typically added as polysilicic acid is designated as B(y) where y is the weight % $SiO_2$ that is left in the catalyst after calcining.

TABLE 1

Attrition Measurements of Catalysts

| Catalyst # | Silica Content Designation | Precipitation pH | Slurry pH | Attrition Loss (%) Air Jet ASTM Method D-5757-95 | | Attrition Loss (%) Jet Cup Test,* | Volume Moment (μm) Jet Cup Test,* | | % Change in Volume Moment |
|---|---|---|---|---|---|---|---|---|---|
| | | | | One Hour | Five Hours | One Hour | One Hour Before | After | |
| 27 | P(0)/B(4) | 6.2 | 6.4 | 24.4 | 32.6 | 26.6 | 78.0 | 39.2 | 49.7 |
| 28 | P(0)/B(8) | 6.2 | 6.4 | 25.7 | 35.4 | 21.8 | 86.7 | 45.4 | 45.4 |
| 41 | P(0)/B(8) | 6.2 | 1.5 | 6.4 | 17.7 | NM | NM | NM | NM |
| 42 | P(0)/B(10) | 6.2 | 1.5 | 5.2 | 15.5 | NM | NM | NM | NM |
| 43 | P(0)/B(10) | 6.2 | 1.5 | 7.6 | 14.6 | 4.8 | 75.4 | 57.3 | 24 |
| 30 | P(0)/B(12) | 6.2 | 6.4 | 12.8 | 22.7 | 8.5 | 88.8 | 67.8 | 23.6 |
| 39 | P(0)/B(12) | 6.2 | 1.5 | 4.7 | 10.0 | NM | NM | NM | NM |
| 31 | P(0)/B(16) | 6.2 | 6.4 | 22.0 | 30.1 | 18.2 | 69.9 | 47.6 | 31.9 |
| 32 | P(0)/B(20) | 6.2 | 6.4 | 34.9 | 35.0 | 51.6 | 63.5 | 23.7 | 62.7 |
| 33 | P(5)/B(12) | 6.2 | 6.4 | 24.2 | 37.3 | 26.6 | 103.0 | 37.3 | 63.8 |
| 34 | P(10)/B(12) | 6.2 | 6.4 | 31.0 | 39.6 | 33.9 | 83.0 | 34.1 | 58.9 |
| 35 | P(15)/B(12) | 6.2 | 6.4 | 42.1 | NM | 39.6 | 90.2 | 27.7 | 59.3 |
| 36 | P(20)/B(12) | 6.2 | 6.4 | 39.1 | NM | 41.3 | 85.9 | 30.1 | 64.6 |
| Co/Zr/SiO$_2$ (a) | | NA | NA | NM | NM | 31.1 | 79.9 | 45.2 | 43.5 |
| Co/Ru/Al$_2$O$_3$ (b) | | NA | NA | NM | NM | 5.7 | 75.1 | 63.7 | 15.2 |

*Proposed ASTM method based on Weeks, S.A., and Dumbill, P., Oil and Gas J., Vol 88, p.38, (1990).
NA: Not applicable
NM: Not measured
(a) Co/Zr/SiO$_2$ was a Davison 952 silica supported 20 wt % cobalt catalyst promoted with 8.5 wt % ZrO$_2$, that was used to develop the jet cup procedure.
(b) Co/Ru/Al$_2$O$_3$ was a Vista B alumina supported 20 wt % cobalt catalyst promoted with 0.5 wt % Ru that was tested using a laboratory slurry bubble column reactor.

High attrition resistance of a catalyst is a crucial requirement for operation in a slurry bubble column reactor, and in fluidized bed reactors. In the data shown in Table 1, the attrition was measured using two methods. The first method followed the ASTM D-5757-95 standard method. The method is based on fluidizing 50 g of catalyst using humidified air passing through three small holes and is described in detail in the ASTM standard. Preferably, the catalysts of the invention have an attrition loss after one hour using this method of less than 15 wt. %, more preferably, less than 10 wt. %, most preferably less than 8 wt. %, based on actual catalyst weight. The second method is based on a proposed ASTM design by Weeks and Dumbill, *Oil, and Gas J.*, Vol. 88, p. 38, (1990) and is described in detail by Zhao, Goodwin, and Oukaci, *Applied Catalysis A.*, Vol. 198, p. 99, (1999). The reason to use two methods was to ensure credibility of the measurements since the two methods should relatively produce similar attrition characteristics. Jet cup results of two cobalt FTS catalysts found to demonstrate adequate attrition resistance for slurry bubble column reactor use, are also included in the Table 1 as benchmark.

In the first method, attrition loss at both 1 hour and 5 hours was measured. In the second method attrition loss at 1 hour was measured and the volume moment of sample before and after the test was calculated based on before and after particle size distribution. The volume moment has units of μm and is a mean particle size based on volume.

The results shown in Table 1 in the table show the following. Reducing the slurry pH to 1.5 before spray drying conventional precipitated bulk iron catalysts discussed in the prior art typically include particulate silica added by precipitation.

The structural properties of catalysts before and after jet cup attrition tests are shown in Table 2. The surface area of the catalysts after calcining range from a low of about 60 $m^2/g$ to a high of 245 $m^2/g$. In comparison, a standard Ruhrchemie iron catalyst with the same ratio of Fe, Cu, and K as the catalysts of this invention shown in Tables 1 and 2, received from the U.S. Department of Energy (DOE), containing 25% silica added by precipitation is included in the table. The surface area of the catalysts increases as silica content increase. Catalyst 41 to 43, the currently preferred embodiments of the invention have lower surface area than the Ruhrchemie catalyst. As will be shown later, these are also the preferred catalysts for the FTS reaction. They also have higher attrition resistance. Thus, contrary to the general belief in the art that surface area increases reactivity, the results here show that surface area is not the most important parameter. In fact, the catalysts prepared with a slurry pH of 1.5 for spray drying have lower surface areas and yet are the preferred embodiments.

TABLE 2

Structural Properties

| Catalyst # | Silica Content Designation | BET Surface Area ($m^2/g$) | | Pore Volume ($cm^3/g$) | | Average Pore Radius (Å) | | Bulk Density (g/cm³) |
| --- | --- | --- | --- | --- | --- | --- | --- | --- |
| | | Fresh | Attrited | Fresh | Attrited | Fresh | Attrited | |
| 27 | P(0)/B(4) | 101.3 | 94.2 | 0.29 | 0.28 | 43.6 | 44.7 | NM |
| 28 | P(0)/B(8) | 124.6 | 108.1 | 0.28 | 0.26 | 35.3 | 36.1 | NM |
| 41 | P(0)/B(8) | 60.5 | NM | NM | NM | NM | NM | NM |
| 42 | P(0)/B(10) | 79.8 | NM | NM | NM | NM | NM | NM |
| 43 | P(0)/B(10) | 81.5 | NM | NM | NM | NM | NM | 1.0 |
| 30 | P(0)/B(12) | 146.2 | 137.1 | 0.28 | 0.29 | 32.0 | 37.7 | NM |
| 39 | P(0)/B(12) | 107.8 | NM | NM | NM | NM | NM | NM |
| 31 | P(0)/B(16) | 176.6 | 173.1 | 0.37 | 0.34 | 33.8 | 33.3 | NM |
| 32 | P(0)/B(20) | 158.3 | 168.2 | 0.33 | 0.34 | 37.3 | 37.7 | NM |
| 33 | P(5)/B(12) | 179.4 | 180.5 | 0.34 | 0.34 | 35.2 | 35.8 | |
| 34 | P(10)/B(12) | 190.8 | 177.1 | 0.37 | 0.35 | 36.9 | 37.3 | 0.89 |
| 35 | P(15)/B912) | 216.8 | 188.7 | 0.36 | 0.33 | 30.8 | 33.4 | 0.95 |
| 36 | P(20)/B(12) | 245.0 | 243.9 | 0.39 | 0.40 | 30.2 | 32.6 | 0.92 |
| Ruhrchemie | P(25) | 300 | NM | NM | NM | NM | NM | NM |

NM: Not measured significantly reduces attrition loss (increases attrition resistance) in catalysts 41, 42, and 43. These are the preferred embodiments of the invention. Further the attrition resistance increases with addition of binder silica above 6 wt. % and then decreases at additions above 16 wt. %. As will be apparent, the two attrition test methods relatively agree, lending credence to the data.

Table 1 further illustrates that the volume mean particle size of the catalysts prepared is typically around 70 to 100 μm.

In addition, Table 1 shows that Catalyst 43 is equivalent in attrition resistance to the benchmark supported cobalt catalysts that have been tested in a laboratory slurry bubble column reactor.

Addition of silica by precipitation as a textural promoter (and not as a binder), is seen from the data of Table 1 to reduce attrition resistance of the catalyst. Thus, in preferred embodiments of the invention, addition of particulate silica, e.g., by precipitation, is minimized or avoided. In contrast, The data set forth in Table 2 further shows that attrition in the jet cup does not cause the pore structure to collapse as minimal change within the error of the measurement is generally seen in the structural properties. The bulk density of catalyst is around 0.9 to 1.0 $g/cm^3$. This is a preferred density since it is much higher than wax (density ≅0.68) and would allow easy separation of the catalyst from the wax. In contrast, typical precipitated catalysts have a density of ≅0.7 $g/cm^3$ making them difficult to separate from the wax.

Table 3 sets forth the attrition resistance of catalysts of the present invention following calcining to convert the iron precursor to iron oxide, as compared to the attrition resistance of the same catalyst following activation to convert the iron oxide to a carbided form. Catalyst carbiding was performed by passing CO through a bed of catalyst at 280° C. The catalyst was heated to this temperature in flowing CO at a heating rate of 1° C./min and then exposed to CO at 280° C. for 12 hours. This is typically how a catalyst is activated prior to use for FTS. For prior conventional catalysts tested by other researchers, it has been shown that carbided catalysts have drastically lower attrition resistance because carbide ($\chi$-Fe$_{2.5}$C) formation causes grain boundaries to grow, thus creating very small particles that can break off. In contrast, as seen in Table 3, the catalysts prepared in this invention generally show equal or better attrition resistance in carbided form.

silica addition method and content. There was a beneficial effect of silica addition using polysilicic acid up to 8 to 12 wt % on selectivity (reduced methane, nearly constant $C_5+$). However, as the PSA silica increased above 12 wt. %, the $C_1$ and $C_2$ to $C_4$ selectivities increased at the expense of $C_5+$

TABLE 3

Attrition Measurements of Fresh and Carbided Catalysts

| Catalyst # | Silica Content Designation | Attrition Loss (%) Jet Cup Method* | | Volume Moment | | | |
|---|---|---|---|---|---|---|---|
| | | Fresh | Carbided | Fresh (μm) | Attrited (% of fresh) | Carbided (μm) | Attrited (% of carbided) |
| 27 | P(0)/B(4)   | 26.6 | NM   | 78.0  | 50.3 | NM   | NM   |
| 28 | P(0)/B(8)   | 21.8 | 21.8 | 86.7  | 52.4 | 77.9 | 46.9 |
| 43 | P(0)/B(10)  | 4.8  | 7.7  | 75.4  | 76.0 | 72.7 | 70.2 |
| 30 | P(0)/B(12)  | 8.5  | NM   | 88.8  | 76.4 | 82.6 | NM   |
| 31 | P(0)/B(16)  | 18.2 | 15.6 | 69.9  | 68.1 | 61.1 | 65.4 |
| 32 | P(0)/B(20)  | 51.6 | NM   | 63.5  | 37.3 | NM   | NM   |
| 33 | P(5)/B(12)  | 26.6 | 13.2 | 103.0 | 36.2 | 86.7 | 48.3 |
| 34 | P(10)/B(12) | 33.9 | NM   | 83    | 41.1 | NM   | NM   |
| 35 | P(10)/B(12) | 39.6 | NM   | 90.2  | 30.7 | NM   | NM   |
| 36 | P(10)/B(12) | 41.3 | NM   | 85.9  | 35.4 | 70.0 | 46.9 |
| Co/Zr/SiO$_2$ | (a) | 31.1 | NA | 79.9 | 56.5 | NA | NA |

*Proposed ASTM method based on Weeks, S.A. and Dumbill, P., Oil and Gas J., Vol. 88, p. 38, (1990).
NM: Not measured
NA: Not applicable
(a) Co/Zr/SiO$_2$ was a Davison 952 silica supported 20-wt. % cobalt catalyst promoted with 8.5 wt. % ZrO$_2$, that was used to develop the jet cup procedure.

Tables 4, 5, and 6 show FTS results for the catalysts. The data in Table 4 was obtained using a 1-g fixed-bed microreactor. The calcined catalyst was heated in flowing CO to 280° C. at 0.1 MPa and held at that temperature for 16 hours. This pre-treatment was followed by reduction of the temperature to 270° C. and syngas was then started at the conditions shown. All of the FTS tests were conducted for 100-150 hours and the catalysts showed no decline in activity over this period of testing. All of the catalysts prepared by this invention had higher activity than the benchmark Ruhrchemie catalyst. The $\alpha$ values of the catalysts ranged from 0.87 to 0.91. The selectivity varied with selectivity. Addition of silica to the catalyst by precipitation caused an increase in $C_1$ to $C_{11}$ fraction. However, $C_5$ to $C_{11}$ fraction was higher when silica was added by precipitation. This suggests that the catalysts of the invention can be tailored using the silica content to maximize either the diesel ($C_{10}$-$C_{20}$) or the gasoline range ($C_5$-$C_{11}$). The best performance was obtained for Catalyst 43. It had the lowest methane selectivity and nearly the highest CO conversion. Catalyst 43 showed 95% conversion over 125 h of testing at 270° C., 1.48 MPa, 2 NL/g cat/h and had less than 4% methane in the hydrocarbon fraction.

TABLE 4

Fischer-Tropsch Synthesis Results (1 g fixed-bed reactor, 1.48 MPa, 270° C., 2NL/g · cat/h, Syngas-H$_2$/CO = 0.67, Ar = 5%)

| Catalyst # | Silica Content Designation | CO Conversion (%) | Product Hydrocarbon Distribution (wt. %) | | | | $\alpha$ |
|---|---|---|---|---|---|---|---|
| | | | CH$_4$ | C$_2$-C$_4$ | C$_5$-C$_{11}$ | C$_{12}$+ | |
| 27 | P(0)/B(4)   | 94.3 | 7.4  | 18.1 | 12.7 | 61.8 | 0.92 |
| 28 | P(0)/B(8)   | 94.1 | 6.8  | 17.6 | 13.0 | 62.5 | 0.91 |
| 43 | P(0)/B(10)  | 95.0 | 3.9  | 17.7 | 23.8 | 54.6 | 0.90 |
| 30 | P(0)/B(12)  | 94.3 | 6.8  | 19.6 | 12.8 | 60.8 | 0.89 |
| 31 | P(0)/B(16)  | 95.5 | 9.9  | 25.0 | 17.3 | 47.8 | 0.87 |
| 32 | P(0)/B(20)  | 94.5 | 9.6  | 23.5 | 17.6 | 49.3 | 0.87 |
| 33 | P(5)/B(12)  | 95.5 | 8.8  | 23.2 | 22.0 | 46.0 | 0.87 |
| 34 | P(10)/B(12) | 94.4 | 10.2 | 23.5 | 26.5 | 39.8 | 0.86 |
| 35 | P(15)/B(12) | 90.1 | 10.2 | 22.4 | 30.5 | 36.9 | 0.87 |
| 36 | P(20)/B(12) | 88.2 | 9.5  | 20.1 | 32.8 | 37.7 | 0.88 |
| Ruhrchemie | P(25) | 86.0 | 8.3 | 21.3 | 14.3 | 56.1 | 0.90 |

TABLE 5

Fischer-Tropsch Synthesis Results for Catalyst 43 (3 g fixed-bed reactor diluted with 9 cc α-alumina, 2.0 MPa, 6000 scc/cc/h, syngas-$H_2$/CO = 0.67, $N_2$ + Ar = 59%)

| Temperature (° C.) | CO Conversion (mol %) | CO Productivity (scc/cc/h) | Selectivity (mol %) | | | Oil + Wax ($C_{10}$-$C_{60}$) g/cc cat/h | $C_{10}$-$C_{20}$ (wt. %) | α |
|---|---|---|---|---|---|---|---|---|
| | | | $CH_4$ | $CO_2$ | $C_2$+ | | | |
| 231 | 24.0 | 350 | 4.0 | 36.0 | 60 | 0.07 | 13.6 | 0.95 |
| 250 | 45.0 | 670 | 3.5 | 39.5 | 57 | 0.13 | 17.1 | 0.94 |
| 268 | 51.0 | 750 | 4.5 | 41.5 | 54 | 0.10 | NM | NM |

NM: Not measured

TABLE 6

Fischer-Tropsch Synthesis Results for Catalyst 43 in a Slurry Reactor* (space velocity = 2300 scc/cc cat/h)

| | Run 1 | Run 2 |
|---|---|---|
| CSTR Stirrer Speed (rev/min) | 1000 | 500 |
| Temperature (° C.) | 230 | 260 |
| Pressure (MPa) | 1.46 | 2.1 |
| Run Time (h) | 300 | 300 |
| CO Conversion (mol %) | 30 | 70 |
| CO Productivity (scc/cc/h) | 350 | 850 |
| Selectivity $CH_4$ | 1.1 | 2.0 |
| (%) $C_2$-$C_4$ | 1.2 | 1.8 |
| $CO_2$ | 48 | 48 |
| $C_5$+ | 49.7 | 48.2 |
| Oil + Wax (cc/cc cat/h) | 0.1 | 0.13 |
| Water (cc/cc cat/h) | 0.022 | 0.008 |
| α | 0.94 | NM |

*500 cc CSTR load d with 10 $cm^3$ catalyst in 200 $cm^3$ shell pelletiz d wax. Syngas composition-56.74% CO, 38.36% $H_2$, balanc $N_2$
NM: N t measured Catalyst 43 was further tested in a larger fixed-bed reactor and a slurry reactor. These results are shown in Tables 5 and 6, respectively. The results in Table 5 were obtained using a deep fixed-bed consisting of 3 $cm^3$ of catalyst mixed with 9 $cm^3$ of inert α-lumina. The dilution was done to prevent overheating during the exothermic FTS reaction. The catalyst was activated using a 0.67 to 1.0 $H_2$ to CO ratio syngas rather than pure CO as in Table 4. The activation procedure consisted of heating the catalyst at 0.1 MPa from 50° C. to 280° C. at 0.5° C./min and holding it at 280° C. for 12 hours. The catalyst was then cooled to 100° C. and pressurized to 2.0 MPa in flowing syngas consisting of 41% $H_2$+CO ($H_2$/CO=0.67) and balance $N_2$+Ar. The syngas was flowed at 6000 scc/cc catalyst/h through the bed and the bed was heated to 180° C. at 2° C./min and then heated from 180° C. to reaction temperature at 0.5° C./h. The synthesis was conducted at three temperatures for 800 hours. The catalyst showed highly stable activity and selectivity and a much higher α=0.94-0.95 compared to Table 3 results. This is attributed to syngas activation as opposed to CO activation. The results show low $CH_4$ selectivity and high $C_2$+ selectivity. The catalyst also shows high WGS activity evidenced by the high $CO_2$ selectivity.

Finally, slurry reactor results are presented in Table 6. Two runs of 300 h duration each were conducted in a 500 cc continuous stirred tank reactor (CSTR). The catalyst was reduced in syngas as described before and then transferred to the reactor in wax. The first test was conducted at 1000-RPM stirrer speed whereas the second at 500-RPM stirrer speed. Following the 300-hour tests, the catalyst-wax mixture was examined. The catalyst was found to quickly settle when a sample of the mixture was heated in hexane to 50° C. Thus, catalyst-wax separation could be easily accomplished. Products were continuously withdrawn from the reactor in the second run through a 5 μm sintered metal filter, which did not plug, indicating the absence of fines even at such harsh RPM conditions. These conditions are more severe than a commercial slurry bubble column reactor (SBCR) and, yet the catalyst was able to withstand the conditions. Thus, the catalyst is deemed suitable for SBCR use; the first ever-attrition resistant precipitated iron catalyst produced that the inventors are aware of. The fixed-bed and slurry reactor results are in general agreement as seen in Tables 5 and 6. In the slurry reactor, a much lower methane selectivity was observed. These results demonstrate that high attrition resistance, high activity, and high selectivity to desirable $C_2$+ products can be achieved in a bulk iron catalyst prepared according to the present invention for FTS. The following examples describe the catalyst preparation steps and results for specific catalysts.

EXAMPLE 1

[Catalyst 27]

This example describes the preparation and testing of the Catalyst 27 [100Fe/5Cu/4.2K containing 4% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing Fe $(NO_3)_3 \cdot 9H_2O$ and Cu $(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 4 wt % $SiO_2$. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 101.3 $m^2$/g. The 1 hour and 5 hours attrition losses of the calcined catalysts were found to be 24.4 and 32.6 wt %, respectively, using ASTM method D-5757-95. F-T reaction studies over 100 h of testing at 270° C., 1.48 MPa, and 2 NL/g-cat/h showed that this catalyst maintained around 94% CO conversion with a methane selectivity of less than 8 wt % and a $C_5$+ selectivity of greater than 75 wt. %.

EXAMPLE 2

[Catalyst 28]

This example describes the preparation and testing of the Catalyst 28 [100Fe/5Cu/4.2K containing 8% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing Fe $(NO_3)_3.9H_2O$ and Cu $(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 8 wt % $SiO_2$. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 124.6 $m^2/g$. The 1 hour and 5 hours attrition loss of the calcined catalysts were found to be 25.7 and 35.4 wt %, respectively, using ASTM method D-5757-95. F-T reaction studies over 100 h of testing at 270° C., 1.48 MPa, and 2 NL/g-cat/h showed that this catalyst maintained around 94% CO conversion with a methane selectivity of less than 7 wt % and a $C_5+$ selectivity of greater than 76 wt %.

EXAMPLE 3

[Catalyst 30]

This example describes the preparation and testing of the Catalyst 30 [100Fe/5Cu/4.2K containing 12% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing Fe $(NO_3)_3.9H_2O$ and Cu $(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 12 wt % $SiO_2$. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 146.2 $m^2/g$. The 1 hour and 5 hours attrition loss of the calcined catalysts was found to be 12.8 and 22.7 wt %, respectively, using ASTM method D-5757-95. F-T reaction studies over 100 h of testing at 270° C., 1.48 MPa, and 2 NL/g-cat/h showed that this catalyst maintained around 95% CO conversion with a methane selectivity of less than 7 wt % and a $C_5+$ selectivity of greater than 74 wt. %.

EXAMPLE 4

[Catalyst 31]

This example describes the preparation and testing of the Catalyst 31 [100Fe/5Cu/4.2K containing 16% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing Fe $(NO3)_3.9H_2O$ and Cu $(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 16 wt % $SiO_2$. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 176.6 $m^2/g$. The 1 hour and 5 hours attrition loss of the calcined catalysts were found to be 22 and 30.1 wt %, respectively, using ASTM method D-5757-95. F-T reaction studies over 100 h of testing at 270° C., 1.48 MPa, and 2 NL/g-cat/h showed that this catalyst maintained around 95% CO conversion with a methane selectivity of less than 10 wt % and a $C_5+$ selectivity of greater than 65 wt. %.

EXAMPLE 5

[Catalyst 32]

This example describes the preparation and testing of the Catalyst 32 [100Fe/5Cu/4.2K containing 20% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing Fe $(NO_3)_3.9H_2O$ and Cu $(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 20% $SiO_2$ binder. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 158.3 $m^2/g$. The 1 hour and 5 hours attrition loss of the calcined catalysts was found to be 34.9 and 35 wt. %, respectively, using ASTM method D-5757-95. F-T reaction studies over 100 h of testing at 270° C., 1.48 MPa, and 2 NL/g-cat/h showed that this catalyst maintained around 95% CO conversion with a methane selectivity of less than 10 wt % and a $C_5+$ selectivity of greater than 67 wt %.

EXAMPLE 6

[Catalyst 33]

This example describes the preparation and testing of the Catalyst 33 [100Fe/5Cu/4.2K containing 12% binder $SiO_2$ by weight and 5 parts by weight of precipitated silica] of the invention. The preparation comprises the following steps: synthesis of catalyst precursor, spray drying of the catalyst precursor and calcination.

The catalyst precursor was prepared by co-precipitation at a constant pH of 6.2 using 1.0 M solution containing Fe $(NO_3)_3 \cdot 9H_2O$ and Cu $(NO_3)_2 \cdot 2.5H_2O$, $Si(OC_2H_5)_5$ in the desired Fe/Cu/Si ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 12 wt. % binder and 5 parts by weight precipitated $SiO_2$. The pH of the slurry was 6.4 before spray drying. A 3 feet diameter×6 feet high Niro Inc. spray dryer was used to spray-dry the slurry to produce a particle with an average size of 70 microns. Finally, the spray-dried catalyst was calcined in an oxygen-containing atmosphere for 5 hours at 300° C.

The surface area of the calcined catalyst was 179.4 $m^2/g$. The 1 hour and 5 hours attrition loss of the calcined catalysts was found to be 24.2 and 37.3 wt %, respectively, using ASTM method D-5757-95. F-T reaction studies over 100 h of testing at 270° C., 1.48 MPa, and 2 NL/g-cat/h showed that this catalyst maintained around 95% CO conversion with a methane selectivity of less than 9 wt % and a $C_5+$ selectivity of greater than 68 wt. %.

EXAMPLE 7

[Catalyst 34]

This example describes the preparation and testing of the Catalyst 34 [100Fe/5Cu/4.2K containing 12% binder $SiO_2$ by weight and 10 parts by weight of precipitated $SiO_2$] catalyst of the invention. The preparation comprises the following steps: synthesis of catalyst precursor, spray drying of the catalyst precursor and calcination.

The catalyst precursor was prepared by co-precipitation at a constant pH of 6.2 using 1.0 M solution containing $Fe(NO_3)_3 \cdot 9H_2O$ and Cu $(NO_3)_2 \cdot 2.5H_2O$, $Si(OC_2H_5)_5$ in the desired Fe/Cu/Si ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 12% binder $SiO_2$ by weight 10 parts by weight precipitated $SiO_2$. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 190.8 $m^2/g$. The 1 hour and 5 hours attrition loss of the calcined catalysts were found to be 31 and 39.6 wt %, respectively in a standard 3-hole tester. F-T reaction studies over 100 h of testing at 270° C., 1.48 MPa, and 2 NL/g-cat/h showed that this catalyst maintained around 94% CO conversion with a methane selectivity of less than 10 wt % and a $C_5+$ selectivity of greater than 66 wt. %.

EXAMPLE 8

[Catalyst 35]

This example describes the preparation and testing of the Catalyst 35 [100Fe/5Cu/4.2K containing 12% binder $SiO_2$ by weight and 15 parts by weight precipitated SiO2] of the invention. The preparation comprises the following steps: synthesis of catalyst precursor, spray drying of the catalyst precursor and calcination.

The catalyst precursor was prepared by co-precipitation at a constant pH of 6.2 using 1.0 M solution containing $Fe(NO_3)_3 \cdot 9H_2O$ and Cu $(NO_3)_2 \cdot 2.5H_2O$, $Si(OC_2H_5)_5$ in the desired Fe/Cu/Si ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 12 wt % $SiO_2$. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 216.8 $m^2/g$. The 1 hour attrition loss of the calcined catalyst was found to be 42.1 wt %, respectively, using ASTM method D-5757-95. F-T reaction studies over 100 h of testing at 270° C., 1.48 MPa, and 2 NL/g-cat/h showed that this catalyst maintained around 90% CO conversion with a methane selectivity of less than 10 wt % and a $C_5+$ selectivity of greater than 67 wt. %.

EXAMPLE 9

[Catalyst 36]

This example describes the preparation and testing of the Catalyst 36 [100Fe/5Cu/4.2K containing 12% binder $SiO_2$ by weight and 20 parts by weight precipitated $SiO_2$] of the invention. The preparation comprises the following steps: synthesis of catalyst precursor, spray drying of the catalyst precursor and calcination.

The catalyst precursor was prepared by co-precipitation at a constant pH of 7.0 using 1.0 M solution containing $Fe(NO_3)_3 \cdot 9H_2O$ and Cu $(NO_3)_2 \cdot 2.5H_2O$, $Si(OC_2H_5)_5$ in the desired Fe/Cu/Si ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 12% binder $SiO_2$ by weight and 20 parts by weight precipitated $SiO_2$. The pH of the slurry was 6.4 before spray drying. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 245 $m^2/g$. The 1 hour attrition loss of the calcined catalysts were found to be 39.1 wt %, respectively, using ASTM method D-5757-95. F-T reaction studies over 100 h of testing at 270° C., 1.48 MPa, and 2 NL/g-cat/h showed that this catalyst maintained around 90% CO conversion with a methane selectivity of less than 10 wt % and a $C_5+$ selectivity of greater than 70 wt %.

EXAMPLE 10

[Catalyst 39]

This example describes the preparation and testing of the Catalyst 39 [100Fe/5Cu/4.2K containing 12% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing $Fe(NO_3)_3.9H_2O$ and $Cu(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 12% binder wt % $SiO_2$. The pH of the slurry was 6.4. Then nitric acid was added to the slurry to reduce the pH to 1.5. A 3 feet diameter ×6×feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 107.8 $m^2/g$. The 1 hour and 5 hours attrition loss of the calcined catalysts was found to be 4.7 and 10.0%, respectively, using ASTM method D-5757-95.

EXAMPLE 11

[Catalyst 41]

This example describes the preparation and testing of the Catalyst 41 [100Fe/5Cu/4.2K containing 8% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing $Fe(NO_3)_3.9H_2O$ and $Cu(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in ratios to produce a final catalyst composition having 8 wt % $SiO_2$. The pH of the slurry was 6.4. Then nitric acid was added to the slurry to reduce the pH to 1.5. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 60.5 $m^2/g$. The 1 hour and 5 hours attrition loss of the calcined catalysts were found to be 6.4 and 17.7%, respectively, using ASTM method D-5757-95.

EXAMPLE 12

[Catalyst 42]

This example describes the preparation and testing of the Catalyst 42 [100Fe/5Cu/4.2K containing 10% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing $Fe(NO_3)_3.9H_2O$ and $Cu(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 10 wt % $SiO_2$. The pH of the slurry was 6.4. Then nitric acid was added to the slurry to reduce the pH to 1.5. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 79.8 $m^2/g$. The 1 hour and 5 hours attrition loss of the calcined catalysts were found to be 5.2 and 15.5%, respectively, using ASTM method D-5757-95. F-T reaction studies over 100 h of testing at 270° C., 1.48 MPa, and 2 NL/g-cat/h showed that this catalyst maintained around 82% CO conversion with a methane selectivity of less than 5 wt % and a $C_5+$ selectivity of greater than 83 wt. %.

EXAMPLE 13

[Catalyst 43]

This example describes the preparation and testing of the Catalyst 43 [100Fe/5Cu/4.2K containing 10% binder $SiO_2$ by weight] of the invention. The preparation comprises the following steps: synthesis of catalyst precursor, spray drying of the catalyst precursor and calcination.

The catalyst precursor was prepared by co-precipitation at a constant pH of 6.2 using 1.0-M solution containing $Fe(NO_3)_3.9H_2O$ and $Cu(NO_3)_3 2.5H_2O$ in the desired Fe/Cu atomic ratio, which was precipitated by adding aqueous ammonium hydroxide solution. The resulting precipitate was then filtered and washed three times with deionized water. The potassium promoter was added as aqueous $KHCO_3$ solution to the undried, reslurried Fe/Cu precipitate. This catalyst precursor was then slurried with polysilicic acid solution in a ratio to produce a final catalyst composition having 10 wt % $SiO_2$. The pH of the slurry was 6.4. Then nitric acid was added to the slurry to reduce the pH to 1.5. A 3 feet diameter×6 feet high Niro Inc. spray dryer was used to spray-dry the slurry to produce a particle size distribution with an average size of 70 microns. Finally, the spray-dried catalyst was calcined in an oxygen-containing atmosphere for 5 hours at 300° C.

The surface area of the calcined catalyst was 81.5 $m^2/g$. The 1 hour and 5 hours attrition loss of the calcined catalysts were found to be 7.6 and 14.6%, respectively, using ASTM method D-5757-95. F-T reaction studies over 100 h of testing at 270° C., 1.48 MPa, and 2 NL/g-cat/h showed that this catalyst maintained around 95% CO conversion with a methane selectivity of less than 4 wt % and a $C_5+$ selectivity of greater than 78 wt. %.

As can be seen from the foregoing examples and Tables 1 through 6, bulk iron catalysts according to the present invention, can be prepared with high attrition resistance in both calcined and carbided states. The catalysts also exhibit very high activity and low methane selectivity, which is required for a commercial FTS process. The long FTS runs in the CSTR demonstrate that the catalyst can withstand conditions in a SBCR, which is the preferred reactor for commercial application.

The invention has been described in considerable detail with reference to various preferred embodiments. However, numerous variations and modifications can be made without departing from the spirit and scope of the invention as described in the foregoing specification and claims.

The invention claimed is:

1. An attrition resistant bulk iron catalyst comprising: substantially spherical particles, said particles comprising a finely divided iron component and a substantially uniformly distributed binder, said iron component being selected from the group consisting of iron oxide precursors, iron oxide derivatives of iron oxide precursors and catalytically activated iron derivatives of iron oxide precursors, said iron component being present in an amount, calculated as $Fe_2O_3$, of at least 70 wt. %, said catalyst having an attrition loss after one hour as determined by ASTM D-5757-95 of less than about 15 wt. % based on actual catalyst weight.

2. The attrition resistant bulk iron catalyst of claim 1 wherein said binder comprises silica.

3. The attrition resistant bulk iron catalyst of claim 1 wherein said binder is derived from a binder oxide precursor of subcolloidal particle size.

4. The attrition resistant bulk iron catalyst of claim 1 wherein said catalyst additionally comprises a copper and/or potassium FTS promoter or a precursor thereof.

5. The attrition resistant bulk iron catalyst of claim 1 wherein said binder comprises less than about 20 wt. % of said catalyst.

6. The attrition resistant bulk iron catalyst of claim 1 wherein said binder comprises between about 8 and about 16 wt. % of said catalyst.

7. The attrition resistant bulk iron catalyst of claim 1 wherein said catalyst has a bulk density exceeding about 0.8 $g/cm^3$.

8. The attrition resistant bulk iron catalyst of claim 1 wherein said iron component is present in an amount, calculated as $Fe_2O_3$, of at least 80 wt. %.

9. A process for producing an attrition resistant bulk iron catalyst comprising the steps:
forming a slurry having a solids content comprising a finely divided iron component and a binder, said iron component being selected from the group consisting of iron oxide precursors, iron oxide derivatives of iron oxide precursors and catalytically activated iron derivatives of iron oxide precursors, said iron component being present in an amount, calculated as $Fe_2O_3$, of at least 70 wt. % of said solids content of said slurry; and,
spray drying the slurry to form spray dried particles.

10. A process for producing an attrition resistant bulk iron catalyst according to claim 9 wherein said binder comprises polysilicic acid.

11. A process for producing an attrition resistant bulk iron catalyst according to claim 10 wherein said iron component comprises said iron oxide precursor.

12. A process for producing an attrition resistant bulk iron catalyst according to claim 11 further comprising the step of calcining said spray dried particles for a time and at a temperature sufficient to convert the iron oxide precursor to iron oxide.

13. A process for producing an attrition resistant bulk iron catalyst according to claim 12 wherein said polysilicic acid is present in said slurry in an amount sufficient to provide a binder content of less than about 20 wt. % following said calcining step.

14. A process for producing an attrition resistant bulk iron catalyst according to claim 9 wherein the slurry is treated with sufficient strong acid to reduce the pH to less than 2.0 prior to the spray drying step.

15. A process for producing an attrition resistant bulk iron catalyst according to claim 14 wherein the slurry is treated with sufficient strong acid to reduce the pH to between about 1.0 and 1.5 prior to the spray drying step.

16. A process for producing an attrition resistant bulk iron catalyst according to claim 14 wherein said strong acid is nitric acid.

17. A process for producing an attrition resistant bulk iron catalyst according to claim 15 wherein said strong acid is nitric acid.

18. A process for producing an attrition resistant bulk iron catalyst according to claim 12 further comprising the step following said calcining step, of activating said catalyst by treating the calcined particles under conditions sufficient to convert the iron oxide to at least one iron carbide.

19. A process for producing hydrocarbons comprising the steps:
contacting syngas with an attrition resistant bulk iron catalyst comprising substantially spherical particles, said particles comprising a finely divided iron component and a substantially uniformly distributed binder, said iron component being selected from the group consisting of iron oxide precursors, iron oxide derivatives of said iron oxide precursors and catalytically activated iron derivatives of said iron oxide precursors, said iron component being present in an amount, calculated as $Fe_2O_3$, of at least 70 wt. %, said catalyst having an attrition loss after one hour as determined by ASTM D-5757-95 of less than about 15 wt. % based on actual catalyst weight, and
recovering a product stream comprising at least one hydrocarbon.

20. The process of claim 19 wherein said contacting step is conducted in a slurry bubble column reactor.

21. The process of claim 20 wherein said syngas has a $H_2/CO$ ratio of less than 1.0.

22. The process of claim 21 wherein said hydrocarbon in said product stream comprises wax.

23. A process for producing hydrogen from carbon monoxide and steam comprising the steps:
contacting a feed comprising carbon monoxide, steam, and optionally hydrogen, with an attrition resistant bulk iron catalyst comprising substantially spherical particles, said particles comprising a finely divided iron component and a substantially uniformly distributed binder, said iron component being selected from the group consisting of iron oxide precursors, iron oxide derivatives of said iron oxide precursors and catalytically activated iron derivatives of said iron oxide precursors, said iron component being present in an amount, calculated as $Fe_2O_3$, of at least 70 wt. %, said catalyst having an attrition loss after one hour as determined by ASTM D-5757-95 of less than about 15 wt. % based on actual catalyst weight, and recovering a product having an increased hydrogen content as compared to said feed stream.

24. The process of claim 23 wherein said contacting step is conducted in a slurry bubble column reactor.

25. The process of claim 24 wherein said feed has a $H_2/CO$ ratio of less than 1.0.

26. The attrition resistant bulk iron catalyst of claim 1, comprising an iron oxide precursor selected from the group consisting of iron nitrate, $Fe(NO_3)_3$, iron sulfate, iron chloride, iron acetate and an iron organometallic compound.

27. The attrition resistant bulk iron catalyst of claim 1, wherein the iron component comprises at least one selected from the group consisting of iron metal, an iron carbide and an iron oxide.

28. The attrition resistant bulk iron catalyst of claim 1, wherein the iron component comprises at least one selected from the group consisting of iron metal, iron oxide, iron nitrate, iron acetate, iron carbide, iron sulfate, and iron chloride.

29. The process of claim 9, wherein the iron component comprises at least one selected from the group consisting of iron nitrate, $Fe(N)_3)_3$, iron sulfate, iron chloride, iron acetate and an iron organometallic compound.

30. The process of claim 9, wherein the iron component comprises at least one selected from the group consisting of iron metal, an iron carbide and an iron oxide.

31. The process of claim 9, wherein the iron component comprises at least one selected from the group consisting of iron metal, iron oxide, iron nitrate, iron acetate, iron carbide, iron sulfate, and iron chloride.

32. The process of claim 19, wherein the iron component comprises at least one selected from the group consisting of iron nitrate, $Fe(NO_3)_3$, iron sulfate, iron chloride, iron acetate and an iron organometallic compound.

33. The process of claim 19, wherein the iron component comprises at least one selected from the group consisting of iron metal, an iron carbide and an iron oxide.

34. The process of claim 19, wherein the iron component comprises at least one selected from the group consisting of iron metal, iron oxide, iron nitrate, iron acetate, iron carbide, iron sulfate, and iron chloride.

35. The process of claim 23, wherein the iron component comprises at least one selected from the group consisting of iron nitrate, $Fe(NO_3)_3$, iron sulfate, iron chloride, iron acetate and an iron organometallic compound.

36. The process of claim 23, wherein the iron component comprises at least one selected from the group consisting of iron metal, an iron carbide and an iron oxide.

37. The process of claim 23, wherein the iron component comprises at least one selected from the group consisting of iron metal, iron oxide, iron nitrate, iron acetate, iron carbide, iron sulfate, and iron chloride.

38. The process of claim 19, wherein the hydrocarbon comprises a mixture of alkanes and alkenes.

39. The attrition resistant bulk iron catalyst of claim 1, wherein the binder is present in an amount of from 8 to 12 wt. %.

40. The process for producing an attrition resistant bulk iron catalyst according to claim 9, wherein the binder is present in the attrition resistant bulk iron catalyst of the spray dried particles in an amount of from 8 to 12 wt. %.

41. The process of claim 19, wherein the attrition resistant bulk iron catalyst comprises the binder in an amount of from 8 to 12 wt. %.

42. The process of claim 23, wherein the binder is present in the attrition resistant bulk iron catalyst in an amount of from 8 to 12 wt. %.

* * * * *

UNITED STATES PATENT AND TRADEMARK OFFICE
CERTIFICATE OF CORRECTION

PATENT NO.        : 7,259,286 B2
APPLICATION NO.   : 10/344896
DATED             : August 21, 2007
INVENTOR(S)       : Kandaswamy Jothimurugesan et al.

It is certified that error appears in the above-identified patent and that said Letters Patent is hereby corrected as shown below:

Column 4, line 7, "catalyst would not suitable for a slurry-phase reactor from an" should read -- catalyst would not be suitable for a slurry-phase reactor from an --.

Column 10, line 25, "added in a binder solution was typically added as polysilicic" should read -- added in a binder solution that was typically added as polysilicic --.

Column 12, line 40, "P(15)(B912)" should read -- P(15)(B12) --.

Column 15, lines 34-36,
"*500 cc CSTR load d with 10 $cm^3$ catalyst in 200 $cm^3$ shell pelletiz d wax. Syngas composition-56.74% CO, 38.36% $H_2$, balance $N_2$ NM: N t measured"
should read -- *500 cc CSTR loaded with 10 $cm^3$ catalyst in 200 $cm^3$ shell pelletized wax. Syngas composition-56.74% CO, 38.36% $H_2$, balance $N_2$ NM: Not measured --;
line 41, "deep fixed-bed consisting of 3 cm3 of catalyst mixed with 9 $cm^3$ of"
should read -- deep fixed-bed consisting of 3 $cm^3$ of catalyst mixed with 9 $cm^3$ of --.

Signed and Sealed this

Eighteenth Day of March, 2008

JON W. DUDAS
*Director of the United States Patent and Trademark Office*